United States Patent Office 3,153,159
Patented Oct. 13, 1964

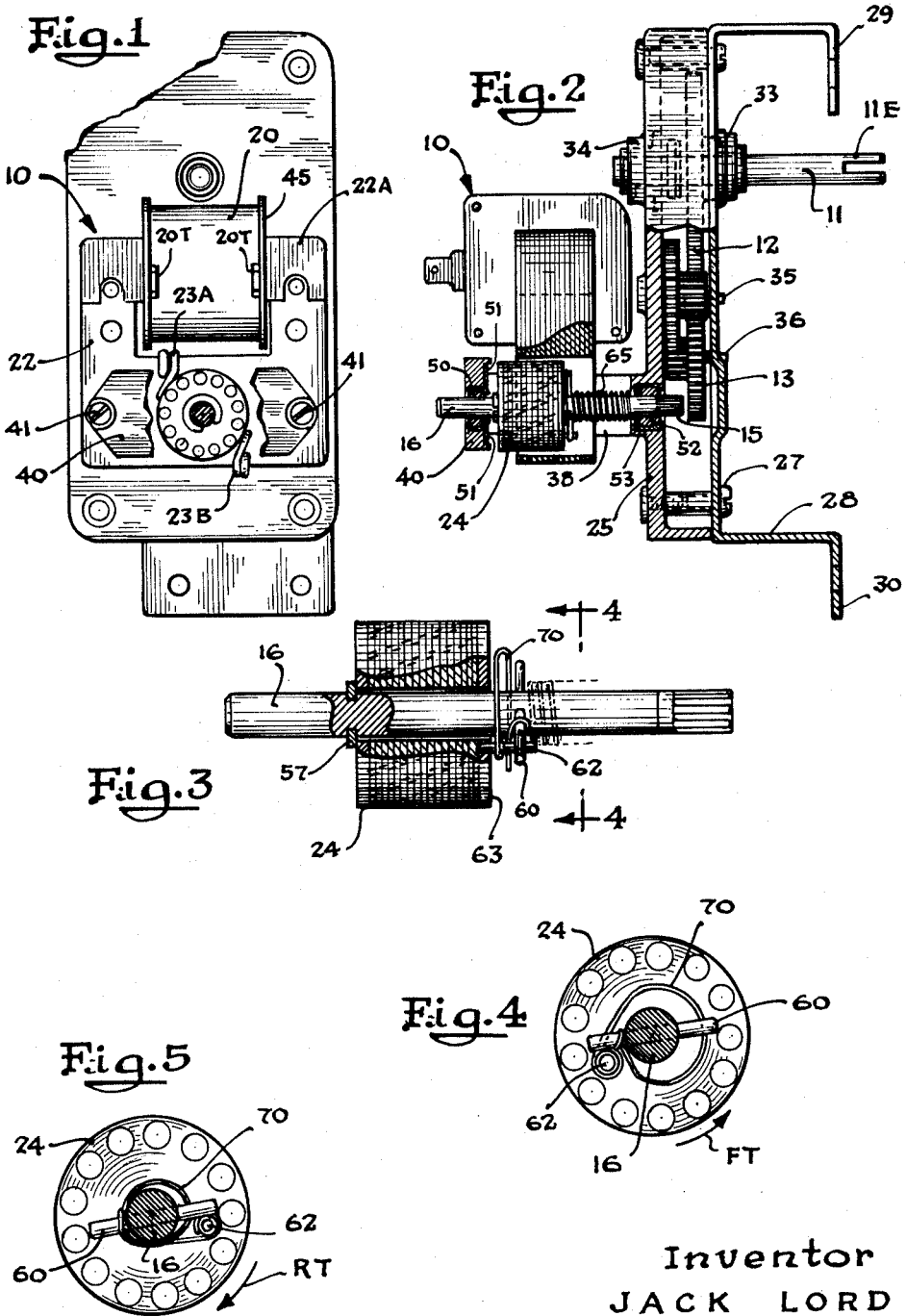

3,153,159
ELECTRIC MOTOR
Jack Lord, Des Plaines, Ill., assignor to Molon Motor & Coil Corp., Rolling Meadows, Ill., a corporation of Illinois
Filed Feb. 4, 1963, Ser. No. 256,023
8 Claims. (Cl. 310—83)

This invention relates to an electric motor and in particular to one for operating a valve or the like through a gear train and in which the rotor and its shaft are supported for solenoid action when the motor is energized.

The electric motor to which the present invention pertains is one in which the rotor is loosely supported on a rotor shaft but has a lost motion connection thereto for driving the shaft when the motor is energized. More specifically, the rotor and its shaft are supported in bearings for axial movement between idle and active positions as the result of solenoid action induced by creation of the magnetic field when the motor is energized. This movement engages a drive gear, carried by the rotor shaft, with the driven gear of a gear train, and occurs against a spring bias which is effective to restore the rotor shaft to its idle position when the motor is de-energized.

Specifically, it is contemplated that the motor will be used to operate a flow control valve in a liquid dispensing machine or the like under circumstances where the motor is to be held stalled for a predetermined period of time to hold the valve open, and thereafter the motor is to be de-energized and the drive and driven gear are to be disengaged to permit the valve to return to its normal position, induced by biasing means associated therewith.

It has been observed that there is a likelihood that the drive gear carried by the rotor shaft will not be effectively or completely disengaged from its associated driven gear, as intended upon de-energization of the motor at which time the solenoid action is to be dissipated. This is especially likely when plastic gears are used, or when loose fittings or wide tolerances prevail, because there is then a pronounced tendency for the gear train to freeze in the condition created by the stalled motor which is applying a forward, resisted torque that forces the drive and driven gears to a set position.

It is therefore the primary object of the present invention to so construct the motor as to achieve positive assurance that the rotor and rotor shaft will be returned to idle position, and gear disengagement established in a positive fashion, when the motor is de-energized. Specifically, it is an object of the present invention to achieve and assure such positive disengagement by interposing a torsion spring between the rotor and the rotor shaft to be wound when forward torque is imparted to the rotor. As a consequence, during the time that the rotor is effective to impart torque to the rotor shaft, the torsion spring is held in a wound or tensioned state characterizing forward torque in the rotor shaft when the gear train is being driven. Then, when the motor is de-energized, the tension of the wound torsion spring is released and is effective through the inertia of the rotor, to impart a reverse kick or impact to the rotor shaft, thereby freeing the drive gear from a set position that may have been created by the stalled drive force, and assuring its disengagement and return to idle position when the motor is de-energized.

Other and further objects of the present invention will be apparent from the following description and claims and are illustrated in the accompanying drawings which, by way of illustration, show a preferred embodiment of the present invention and the principle thereof and what I now consider to be the best mode contemplated for applying that principle. Other embodiments of the invention embodying the same or equivalent principle may be used and structural changes may be made as desired by those skilled in the art without departing from the present invention and the purview of the appended claims.

In the drawings:
FIG. 1 is a front elevation of a motor constructed under and in accordance with the present invention;
FIG. 2 is a side elevation of the motor assembly illustrated in FIG. 1, and partly in section;
FIG. 3 is a sectional view of the rotor and rotor shaft assembly of the present invention;
FIG. 4 is an end elevation substantially on the line 4—4 of FIG. 3; and
FIG. 5 is an end elevation similar to FIG. 4 but showing a different state of the rotor.

The motor assembly 10 illustrated in FIGS. 1 and 2 is specifically arranged, for purposes of disclosure only, to rotate a valve control shaft 11 having an end 11E adapted to be coupled to the control shaft of a flow control valve, such as is commonly found in a beverage dispensing machine. The shaft 11 is rotated against the return bias of a coil spring, not shown.

The valve control shaft 11 is provided at the left-hand end as viewed in FIG. 2 with a relatively large gear 12, and a gear train that needs no specific description, inclusive of a driven gear 13, is interposed between the gear 12 and a drive gear 15 that is carried by a rotor shaft 16 that is a part of the motor 10. All the designated gears are of plastic, such as nylon, Delrin or the like, having appreciable tolerance.

The motor 10 is a shaded pole motor of a known kind including a coil 20, a core lamination 22, shading coils 23A and 23B, and a rotor 24. The motor parts thus far described are located, as viewed in FIG. 2, on the outboard side of a gear box 25, and this gear box is removably secured by screws 27 to a gear box cover 28. The gear box cover 28 has brackets 29 and 30 projecting from the back thereof, enabling the apparatus to be mounted in the beverage dispensing machine in which the present apparatus is to be used.

Bearing mounts 33 and 34 are afforded in the gear box for rotatably supporting the valve control shaft 11, and the gear train is operatively supported within the gear box as will be evident in FIG. 2. The gear 12 is pinned to its shaft 11, and the gear 15 is also fast on the rotor shaft, but the intermediate gears of the gear train are loosely fitted on pins 35 and 36 that are fixed to the gear box and have ends projected through openings in the cover 28.

The outboard side of the gear box is provided with a pair of outwardly projecting mounting lugs as 38, FIG. 2. Opposed legs of the core lamination 22 are rigidly secured to the lugs 38 by means including a bearing bracket 40 in the form of a strap that is located on the side of the core lamination opposite the lugs 38. The bracket 40 has a pair of end openings therein aligned with tapped openings in the lugs 38. Retainer screws 41 are passed through the end openings in the bearing bracket and into the tapped receiving sockets that are presented by mounting lugs 38. The bobbin 45 for the coil 20 is supported on the top span laminations 22A of the core or stator 22 in the usual fashion, and the coil 20 is provided with a pair of terminals 20T enabling the motor to be energized upon current supplied thereto.

The rotor 24 is housed within the stator or core 22 in the usual fashion as will be evident in FIG. 2. The rotor, as will be described hereinafter, is loosely mounted on the rotor shaft and has a lost motion connection thereto. The outer or left-hand end of the rotor shaft 16 as viewed in FIG. 2 is supported for free axial movement in a bearing 50. The exterior of the bearing 50 is spherical for self-centering purposes and is retained, by a clip 51, in an opening of like configuration located at the medial portion of the bracket 40.

The opposite end of the rotor shaft 16 has the driving gear or pinion 15 fixed thereto, and this pinion extends into the gear box as shown in FIG. 2. It may be noted that the gear 15 is preferably formed from a durable plastic such as nylon, Delrin or the like, although in some instances the gear as 15 can be hobbed on the steel shaft 16. The portion of the rotor shaft 16 immediately adjacent the drive gear 15 is rotatably supported in a self-centering bearing 52 that is similar to the bearing 50 and which is supported in a similar fashion in a bearing mount 53 that is a part of the gear box.

The rotor and rotor shaft are thus supported in the bearings 50 and 52 for axial movement or solenoid action upon establishment of the magnetic field when the motor is energized. In the normal or idle state of the rotor, the plastic drive gear 15 is disengaged from its related driven gear 13 of the gear train. This is a biased relationship as will be explained and characterizes the de-energized state of the motor and the inoperative position of the valve that is controlled by the shaft 11. When the motor is energized, the rotor and its shaft are shifted to the right by solenoid action to be centered within the stator assembly 22 as viewed in FIG. 2, and a positive drive engagement is thereupon established between the gears 15 and 55.

The rotor 24 has a fixed and determined axial position relative to its shaft 16. This position is determined by a C-washer 57 at the outboard or left-hand side of the rotor 24, as viewed in FIG. 3, and a radially disposed retainer pin 60 of the roll pin type pressed into a transverse or radial opening in the shaft 16 on the inboard side of the rotor 24.

The roll pin 60 is part of a lost motion connection that enables the torque of the rotor 24 to be applied to the shaft 16. Thus, an axially projecting drive pin 62 is secured to one of the end plates 63 of the rotor assembly, and this pin is projected into the path of the roll pin 60.

The rotor is normally biased to its idle position illustrated in FIG. 2 by a coil spring 65 that concentrically surrounds the portion of the rotor shaft 16 that is between the bearing mount 53 and the end plate 63 of the rotor. One end of the coil spring 65 bears against the bearing mount 53 and the other end applies tension to the pin 60, and thus the coil spring 65 is normally effective to urge the rotor to its idle position that characterizes lack of positive engagement between the gears 15 and 13.

As shown in FIGS. 3 and 4, a torsion spring 70 of piano wire is anchored at one end to the rotor drive pin 62 and is wound once around the shaft 16 with the opposite end thereof anchoed to the pin 60. The spring 70 urges pin 62 against pin 60, tending to impart reverse torque to the rotor. When the motor is energized, the field is effective to impart counterclockwise or forward torque FT, FIG. 4, to the rotor 24 as viewed in FIG. 4. Since the rotor is loosely set on the shaft 16, it partakes of lost motion at this time, that is, does not impart forward torque to shaft 16. However, pin 62, fixed to the rotor, moves away from the left-hand end of the pin 60, FIG. 4, when the motor is energized, and this movement occurs during the lost motion action until the pin 62 strikes the right-hand end of the pin 60, causing the torsion spring 70 to be wound, FIG. 5, until rotor torque and spring torque are equal. Thereafter, the pin 62 is effective on the pin 60 to impart forward torque to the rotor shaft 16, driving the gear train, and spring 70 is held in a state of tension.

Under actual operating conditions, the motor is held stalled for a predetermined period of time characterizing a held-open condition of the valve that is controlled by the shaft 11. As a consequence, the drive gear or pinion 15 forces the gear train, and it can happen upon de-energization of the motor that the expected return action of the rotor to its idle position, under the impulse of the return coil spring 65, does not occur efficiently, resulting in failure of the valve to quickly or completely close. This is due primarily to the tendency for the forced drive gear 15 to stick or hang up on the drive gear 13. However, this possibility or condition is obviated under the present invention, because when the motor is de-energized, causing collapse of the magnetic field, torque is no longer applied to the rotor, and the rotor is then subject to the stored energy in the wound spring 70 which becomes effective to impart a rather abrupt reverse torque RT, FIG. 5, thereto causing the pin 62 to move rapidly and with a relatively large amount of momentum from its active position illustrated in FIG. 5 to its idle or inactive position illustrated in FIG. 4.

In other words, when the spring 70 unwinds as a result of de-energization of the motor, a rather strong kick in the direction of reverse torque RT, FIG. 5, is imparted to the pin 60. This reverse torque frees the gear 15 in a positive manner from gear 13 as an incident to the slight return twist in the rotor shaft that is a concomitant of the unwinding of the spring 70. This occurs simultaneously with the return action of the spring 65. Consequently, at the end of each cycle of operation there is assurance that the gear 15 will be freed from the gear 13 permitting the gear train and the valve to restore themselves under the influence of the return spring that is associated with the valve control shaft 11, and assuring that the gear 15 is restored to its idle or disengaged position under the influence of spring 65.

It will be seen from the foregoing that under the present invention, involving a rotor-driven gear, urged into engagement by solenoid action, that disengagement thereof from the related driven gear is assured by imparting reverse torque to the drive shaft when the forward torque established by the motor ceases. This is made possible by an energy storing device that stores a portion of the forward torque of the rotor and releases it in the form of reverse torque when the motor is de-energized.

Hence, while I have illustrated and described a preferred embodiment of my invention, it is to be understood that this is capable of variation and modification and I therefore do not wish to be limited to the precise details set forth, but desire to avail myself of such changes and alterations as fall within the purview of the following claims.

I claim:

1. In an electric motor, a rotor shaft, a rotor mounted on the shaft and having a lost motion rotary drive connection to the rotor shaft for imparting torque thereto in a forward direction when the motor is energized, said rotor and rotor shaft being supported for axial solenoid movement from an idle to an active position when the motor is energized, a drive gear secured to the rotor shaft and adapted to mesh with a driven gear when the rotor shaft is in its active position, and a torsion spring anchored between the rotor and rotor shaft and adapted to be wound by the rotor in the course of its lost rotary motion to store energy for imparting reverse torque to said shaft when the motor is de-energized.

2. In an electric motor, a rotor shaft, a rotor loosely mounted on the shaft and being connected to the rotor shaft for imparting torque thereto in a forward direction after a predetermined amount of free rotary motion when the motor is energized, said rotor and rotor shaft being supported for axial solenoid movement from an idle to an active position when the motor is energized, a drive gear secured to the rotor shaft and adapted to mesh with a driven gear when the rotor shaft is in its active position, spring means for returning the rotor shaft and its drive gear to idle position when the motor is energized, and a torsion spring anchored between the rotor and rotor shaft and adapted to be wound by the rotor in the course of its free rotary motion to store energy for imparting reverse torque to said shaft and drive gear when the motor is de-energized thereby to assist in freeing the drive and driven gear when the motor is de-energized.

3. In an electric motor for driving a driven gear, a drive gear adapted to be engaged with said driven gear, said drive gear being carried on a rotor-driven shaft, a rotor assembled on the drive shaft in such a manner as to impart torque thereto in a forward direction after a predetermined amount of free rotary motion when the motor is energized, said rotor shaft and its drive gear being supported for axial movement from an idle to an active position to engage the drive and driven gears as the result of solenoid action when the motor is energized, spring means for returning the rotor shaft and its drive gear to idle position when the motor is de-energized, and a torsion spring connected to said rotor shaft and arranged to be tensioned upon the free rotary motion rotor to store energy for imparting reverse torque to said shaft when the motor is de-energized thereby to assist in freeing the drive and driven gears.

4. In a motor for driving a driven gear, a drive shaft and a drive gear assembly supported for axial movement from an idle position where said gears are disengaged to an active position where said gears are engaged, means for producing gear engagement and for imparting forward torque to said shaft to drive the driven gear when the motor is energized, means to restore the drive gear and its shaft to idle position when the motor is de-energized, and an energy storage device adapted to store energy when the motor is energized and to impart reverse torque to said shaft when the motor is de-energized thereby to assist gear disengagement.

5. In a motor for driving a driven gear, a drive shaft and a drive gear assembly supported for axial movement from an idle position where said gears are disengaged to an active position where said gears are engaged, means for producing gear engagement and for imparting forward torque to said shaft to drive the driven gear after a predetermined amount of lost rotary motion when the motor is energized, means to restore the drive gear and its shaft to idle position when the motor is de-energized, and an energy storage device adapted to store energy during the occurrence of said lost motion when the motor is energized and to impart reverse torque to said shaft when the motor is de-energized thereby to assist gear disengagement.

6. In an electric motor for driving a gear train inclusive of a driven gear, a core, a rotor shaft within the core, a rotor loosely mounted on the shaft and having a lost motion pin connection to the rotor shaft for imparting torque thereto in a forward direction when the motor is energized, said rotor shaft being supported in bearings for axial solenoid movement from an idle to an active position when the motor is energized, a drive gear secured to one end of the rotor shaft and adapted to mesh with said driven gear when the rotor shaft is in its active position, a coil spring normally effective to hold the rotor and rotor shaft in the idle position and being under compression in the active position to thereby restore the rotor and rotor shaft to idle position when the motor is de-energized, and a torsion spring anchored between the rotor and rotor shaft and adapted to be wound by the rotor in the course of its lost motion to store energy for imparting reverse torque to said shaft when the motor is de-energized.

7. In an electric motor for driving a gear train inclusive of a driven gear and which is to be held in a stalled condition for a predetermined period of time, a rotor shaft, a rotor loosely mounted on the shaft and having a lost motion connection to the rotor shaft for imparting torque thereto in a forward direction when the motor is energized, said rotor and rotor shaft being supported for axial solenoid movement from an idle to an active position when the motor is energized, a plastic drive gear secured to the rotor shaft and adapted to mesh with a driven gear when the rotor shaft is in its active position, a coil spring normally effective to hold the rotor and rotor shaft in the idle position and being under compression in the active position to thereby restore the rotor and rotor shaft to idle position when the motor is de-energized, and a torsion spring anchored between the rotor and rotor shaft and adapted to be wound by the rotor in the course of its lost motion to store energy for imparting reverse torque to said shaft when the motor is de-energized.

8. In an electric motor for driving a gear train inclusive of a driven gear, which is to be held in a stalled condition for a selected period of time, a rotor shaft adapted to be rotated, a rotor mounted on said rotor shaft for rotation relative to said shaft and for rotation with said shaft, said rotor and rotor shaft being supported for axial movement from an idle to an active position when the motor is energized, a drive gear secured to the rotor shaft and adapted to mesh with a driven gear when the rotor shaft is in its active position, a driving pin means secured to said rotor and adapted to rotate with said rotor, a driven pin means on said rotor shaft adapted to be engaged by said driving pin means of said rotor to drive said rotor shaft in the same direction as the rotor is rotating, energization of the motor causing said rotor to turn in a first direction as the rotor is rotating and through said driving and driven pin means causing said rotor shaft to turn in a first direction and drive said gear to its stalled condition, and a torsion spring anchored between said rotor and said rotor shaft and adapted to be wound by the rotor during its movement to engage said driving pin means with said driven pin means, said torsion spring adapted to impart its stored energy to reverse the rotation of the rotor when the motor is de-energized to cause said driving pin to impart a reverse direction torque to said drive shaft when the motor is de-energized.

References Cited in the file of this patent
UNITED STATES PATENTS
3,109,950     Muller _____ Nov. 5, 1963